April 19, 1960 J. B. HART 2,933,352
ANTI-FRICTION BEARING
Filed Jan. 23, 1957 2 Sheets-Sheet 1

INVENTOR.
JOHN B. HART.
BY
George A. Schwenger
HIS ATTORNEY.

April 19, 1960 J. B. HART 2,933,352
ANTI-FRICTION BEARING
Filed Jan. 23, 1957 2 Sheets-Sheet 2

INVENTOR.
JOHN B. HART.
BY George A. Schwenzer
HIS ATTORNEY.

United States Patent Office
2,933,352
Patented Apr. 19, 1960

2,933,352

ANTI-FRICTION BEARING

John B. Hart, Cincinnati, Ohio

Application January 23, 1957, Serial No. 635,914

9 Claims. (Cl. 308—1)

This invention relates to bearings for rotating elements to be supported and free to move against a minimum of friction. More particularly it relates to bearings for indicator arms on scales and meters. It specifically relates to bearings for sensitive measuring instruments and machines or equipment wherein it is essential to reduce the rotational frictional forces to as small a value as possible despite the mass of the rotating shaft and/or mass of any appendages thereto.

With this anti-friction bearing, readings of magnetic dip needles, balances, electrical current and voltage measuring meters, and torsionless movement apparatuses for measuring and weighing can be read to a high degree of accuracy by reducing the rotational frictional force to a value even below that for kinetic friction between two surfaces.

This invention has for its object to provide a bearing adapted for mounting a shaft supporting scaler indicators on measuring devices whereby the movement of the shaft will be retarded by an absolute minimum of friction. Said measuring devices include electrical instruments for measuring currents, voltages, charges, strength and direction of magnetic fields, masses, gravitational and elastic forces, accelerations, and viscous forces. When the invention to be described herein is used in connection with magnetic fields, it will be at least partly composed of non-magnetic materials in order not to distort the field to be measured.

Another object is to provide a relatively frictionless bearing for balances whereby large masses can be weighed to a high degree of accuracy. The said bearing would replace the more delicate knife edge in conventional balances.

These and other objects will become more apparent to those skilled in the art by reference to the specifications and the drawings forming part of this application.

In the drawings:

(In Figure 1 the concave collar surfaces are represented as being cut off along the vertical centerline of the wheel.)

Figure 5:
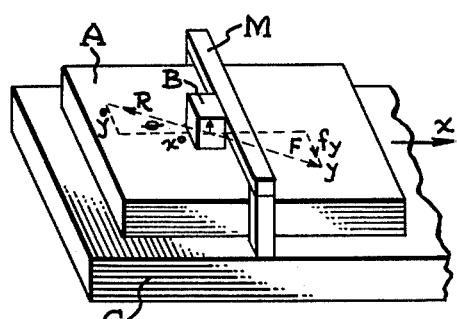
Figure 5 is a diagram in perspective to explain and illustrate the mathematical proof of the principle of the present anti-friction bearing.

This invention can best be understood from a consideration of Figure 5 showing a somewhat analagous mechanical situation. Figure 5 illustrates a movable board A free to move at any velocity laterally and under a stationary bar M which is fixed to the table C. Another block B is free to slide on A and sidewise along the bar M. It is assumed with no loss of generality that there is no friction between block B and the bar M—since the latter serves as a constraining member for purposes of illustration only. When the board A is moved to the right at a velocity $x$ relative to the table top C, the block B, being constrained by the bar M, will have a velocity of $x$ to the left relative to the board A. When the block B is given a velocity $y$ perpendicular to the motion of board A, the path the block B describes over the board A will be the resultant of these two motions. This resultant motion is indicated by R.

Frictional force always act in a direction opposite to the relative motion and is herein represented by the vector F. This vector has a component in the $y$ direction and can be represented by $F_y = F \sin \theta$. However, from the vector triangle of velocities the sine of theta equals $y$ divided by the square root of the sum of squares $x$ and $y$. Arranged in an equation it is as follows:

$$F_y = F \frac{y}{(x^2+y^2)^{1/2}}$$

It is apparent from this last formula that as the velocity of $x$ approaches infinity the frictional force in the $y$ direction approaches zero.

In the anti-friction bearing the board A is replaced by a rotatable element, or supporting member, in the form of a grooved wheel and the block B is replaced by a portion on a cylindrical rod or other rotatable member in engagement with and supported by the support member. The constraining function of bar M is produced by the cooperative engagement of a curved surface on the cylindrical rod and a concave groove in the bearing. In the foregoing mechanical replacements the velocities $x$ and $y$ may be replaced by their corresponding angular forms to obtain a mathematical description of the anti-friction bearing. This formula predicts that the rotational friction of the cylindrical rod decreases as the linear speed of the grooved wheels is increased. This prediction has been experimentally verified and is valid as long as there are no viscous forces between the rod and the rotating grooved wheels. When viscous forces are present between the wheel and the cylindrical rod an increase in the speed of the wheel beyond a certain relatively small value does not result in a decrease in the rotational frictional force between the surfaces. Hence this invention can be used to determine whether substances are viscous or non-viscous in nature.

Figure 1:
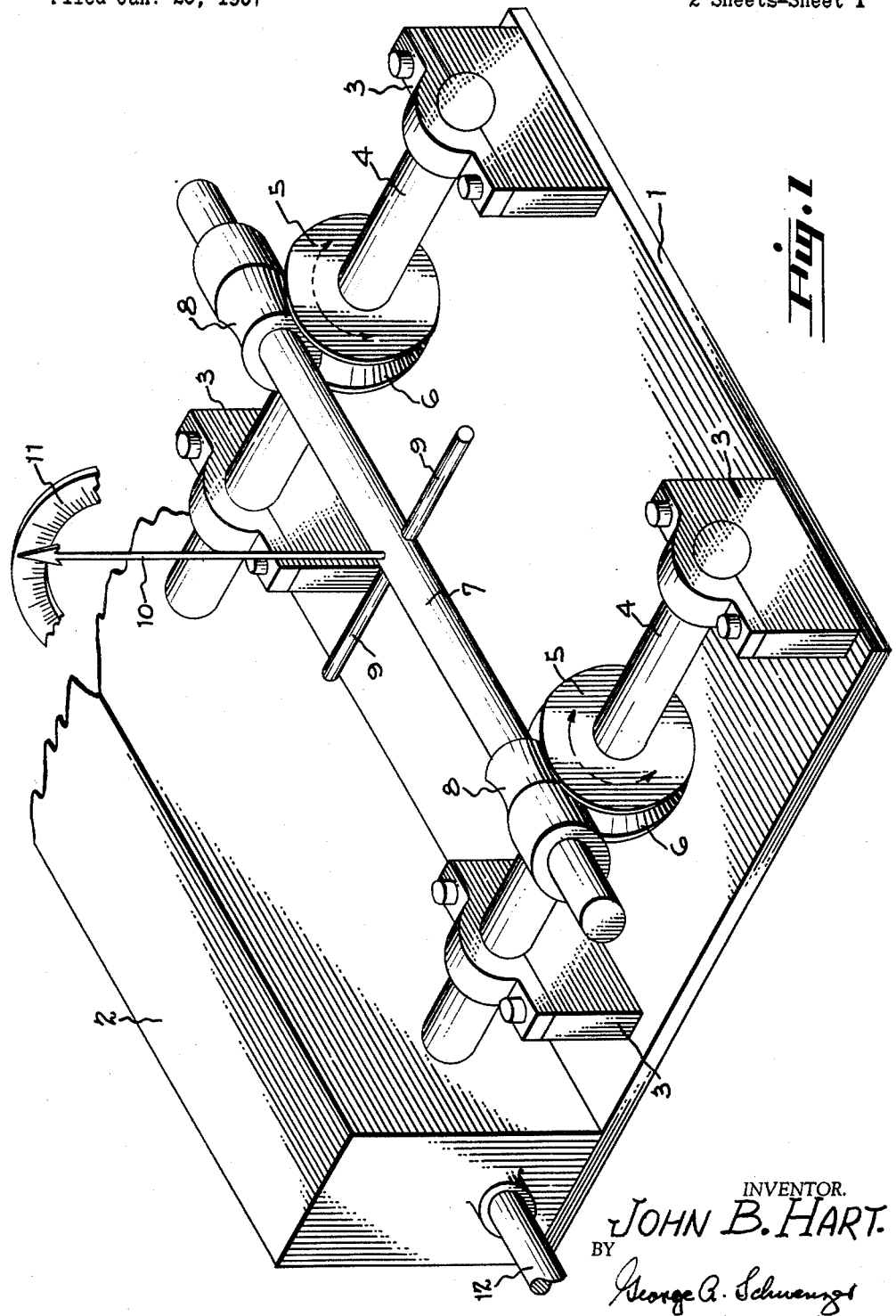
Figure 1 is a perspective view of an indicator mechanism including two anti-friction bearings constructed in accordance with the present invention, the bearings supporting a shaft in a horizontal position.
Figure 4:
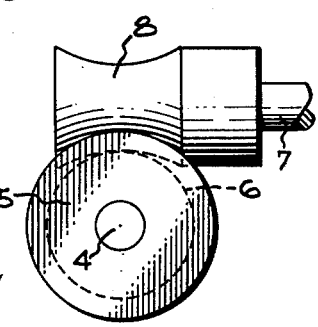
Figure 4 is a partial view of another form of the anti-friction bearing in which the shaft collar is provided with a concave surface extending over the centerline of the wheel.

Figure 1 illustrates a base plate upon which is secured journal bearings 3. Rotatably mounted in the journals are shafts 4 adapted for rotation in either direction towards or away from each other. Fixed to the shafts and rotated by them are wheels 5 having curved surfaces 6, defining a concave peripheral groove. These wheels are rotated in order to obtain the desired relative motion between the surfaces of the rod and wheels. The linear velocity of the wheels is determined by the minimal frictional requirements of a specific application. A cylindrical rod 7 with its axis perpendicular to the axis of the grooved wheel shafts has curved surfaces 8 to match the surfaces of the grooved wheels. The curved surfaces 8 may be formed either in the rod itself or in material which can be attached concentrically to the rod. These collars 8 may have various shapes ranging from that shown in Figure 4 to the spheres shown in Figure 2. The curved surfaces 8 are designed to prevent the rod 7 from creeping over the moving grooved wheels in the longitudinal direction of the rod.

The shafts 4 are rotated by means of gears within a gear box 2. The gears not shown are in train and drive the grooved wheel shafts at the same speed. Extending from the gear box there is a main drive shaft 12 for connecting the system to a motor for driving the gears and the grooved wheels.

Secured in the rod and perpendicular to it are arms 9 which may be used as points of application of forces to be measured in the form of torques about the longitudinal axis of the rod 7. Also secured to the rod 7 is the indicator arm 10 rotatable with the rod and free to move arcuately across a graduated dial 11 which is suitably supported from the base. The arm 9, indicator 10, and rod 7 should have a common center of gravity slightly below the longitudinal axis of the cylinder when the bearing assembly is to be used for measuring forces of various kinds. However, in a modification in which the arm 9 is a magnetized needle and the rest of the assembly constructed of non-magnetic materials so that the magnetized needle and bearing may be used as a magnetic dip needle to indicate the direction of magnetic lines of force or when the rod 7 without the arm 9 and the indicator 10 is used as a "frictionless" pulley, for example, in an Atwood machine or other similar device, the center of gravity of the total assembly resting on the grooved wheels must be on the longitudinal axis of the rod 7.

Figure 2:
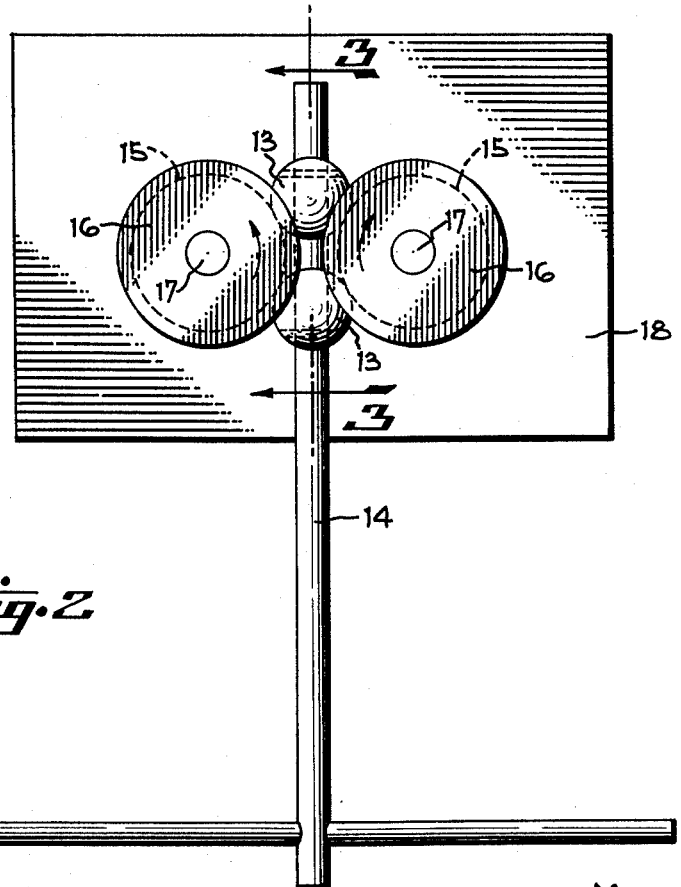
Figure 2 is a front view in elevation of a modified form of anti-friction bearing showing the use of spherical surfaces and a torsion rod suspended in a vertical plane between two grooved wheels.
Figure 3:
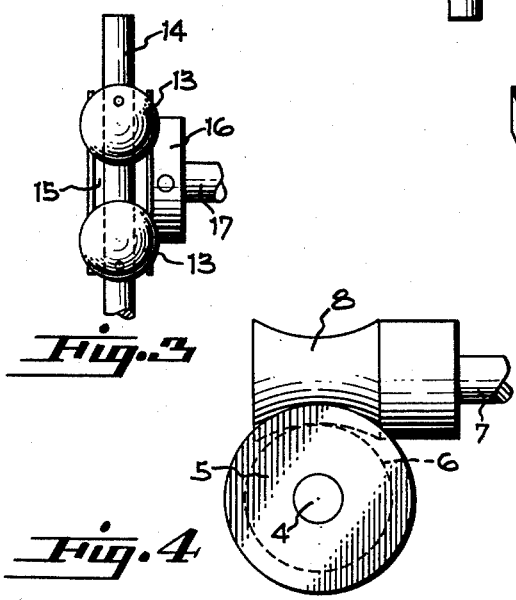
Figure 3 is a section of the anti-friction bearing taken on line 3—3 of Figure 2.

When it is desired to use the anti-friction bearing to support a shaft positioned in a vertical plane, as shown in Figure 2, spherical balls 13 are secured to the rod or shaft 14 to match the curvature of the grooves 15 in grooved wheels 16 that are fixed on shafts 17. The shafts rotate the grooved wheels towards or away from each other. The shafts are driven by means of gears (not shown) rotatably mounted in a gear box 18 which in turn are driven by a motor or other power source.

The anti-friction bearing assembly herein described can employ any number of such grooved wheels positioned around the rotating shaft either in pairs or singly—depending upon the type of application and manner of installation.

The bearing as illustrated in Figure 2 can be used for torsionless movement instruments and other devices used in laboratories to illustrate basic principles of physics, e.g., the inertia of differently shaped objects.

While concave surfaces are shown on the grooved wheels for illustration only, other configurations work equally well and, in some cases, are easier to obtain. Other possible configurations range from V grooves to flat surfaced and flanged wheels.

Nothing said herein is to be construed as a claim that the sum total of friction between two surfaces can be made as small as one pleases. On the contrary, the present invention is a method whereby the component of frictional force in one direction between two surfaces can be made progressively smaller while making the component of the frictional force in the perpendicular direction correspondingly larger.

Having thus described my invention and what I desire to secure by Letters Patent I claim:

1. An anti-friction bearing comprising a driven shaft rotatably supported on ends thereof, a wheel having a peripheral groove formed therein secured on and driven by said shaft, and a rod perpendicular to said shaft and retained across said grooved wheel providing contact on said grooved wheel to form a bearing having reduced rotational friction between said rod and grooved wheel upon rotation of said grooved wheel.

2. An anti-friction bearing comprising driven shafts rotatably supported on ends thereof, multiple wheels having circumferential curved grooves secured to and rotated by said shafts, a rod perpendicular to said driven shafts having concave grooves to match and rest within said concave grooves on said wheels providing end thrust inhibiting means, said rod and grooved wheels providing a bearing having reduced rotational friction between said grooved wheels and said rod when said grooved wheels are rotated.

3. An anti-friction bearing comprising rotatable wheels having curved circumferential surfaces, a rod perpendicular of the axis of said wheels, spheres secured to said rod and in contact within the said circumferential surfaces on said wheels to provide contact between said spheres and said wheels to form a bearing having reduced rotational friction in said bearing when said wheels are rotated.

4. An anti-friction bearing comprising rotatable shafts, multiple rotatable wheels secured to and driven by said shafts, said wheels rotatable towards each other, curved surfaces on said wheels, a rod adapted to be supported perpendicular to said shafts and between said wheels to provide a bearing having a minimum of frictional resistance to rotation of said rod when said wheels are rotated.

5. An anti-friction bearing comprising a multiple of rotatable shafts, a multiple of wheels secured to said shafts and rotatable therewith, said wheels having curved sides defining a peripheral groove, a rod perpendicular to the axis of said shafts supported on said wheels and between said curved sides and rotatable between said wheels to provide a minimum of rotational friction between said wheels and said rod when said wheels are rotated.

6. An anti-friction bearing for rotatably supporting a first rotatable member, said bearing comprising a rotatable supporting member, said supporting member having a concave peripheral groove formed therein, means mounting said rotatable supporting member for rotation about an axis perpendicular to the axis of said first member, and power means independent of said first rotatable member for rotating said supporting member, said first member resting in said groove and being supported by said rotatable supporting member.

7. An anti-friction bearing for rotatably supporting a first rotatable member, said bearing comprising two rotatable supporting members spaced longitudinally of said first member, each of said supporting members having a concave peripheral groove formed therein, means mounting each of said rotatable supporting members for rotation about an axis perpendicular to the axis of said first member, and power means independent of said first rotatable member for rotating said supporting members, said first member resting in said grooves and being supported by said rotatable supporting members.

8. An anti-friction bearing for supporting a first member having a surface adapted to be moved by the application of an external force in a first direction, said bearing comprising a second rotatable member having a surface engaging and supporting said first member, and power means independent of said first member for rotating said second member about an axis parallel to the direction of movement of the surface of said first member at its engagement with the surface of said second member, said means being adapted to drive said second member so that its surface speed is substantially in excess of the speed of said first member.

9. A method of supporting a member adapted to move in response to the application of an external force in a first direction whereby the coefficient of friction impeding movement of the first member in said direction is decreased to a predetermined magnitude, said method comprising the steps of placing a supporting surface beneath said member, and shifting said surface at a uniform rate beneath said member at a rate substantially greater than the rate of movement of said member, said surface being shifted in a direction perpendicular to the direction of movement of that portion of the surface of said member in engagement with said supporting surface.

References Cited in the file of this patent

UNITED STATES PATENTS

| | | |
|---|---|---|
| 248,445 | Gately | Oct. 18, 1881 |
| 654,103 | Schrottke | July 17, 1900 |
| 703,402 | Gottbreht | July 1, 1902 |
| 1,600,071 | Shaifer | Sept. 14, 1926 |
| 1,648,441 | Brower | Nov. 8, 1927 |
| 1,722,948 | Tanner | July 30, 1929 |
| 2,048,834 | Young | July 28, 1936 |
| 2,354,413 | Walter | July 25, 1944 |
| 2,537,088 | Raspet | Jan. 9, 1951 |
| 2,577,942 | Agins | Dec. 11, 1951 |